United States Patent
Rupp et al.

(10) Patent No.: US 12,329,343 B2
(45) Date of Patent: Jun. 17, 2025

(54) SYSTEM COMPRISING A DISHWASHER AND METHOD FOR OPERATING A DISHWASHER

(71) Applicant: BSH Hausgeräte GmbH, Munich (DE)

(72) Inventors: Michael Rupp, Holzheim (DE); Kai Paintner, Welden (DE); Kuldeep Narayan Singh, Dillingen a.d. Donau (DE)

(73) Assignee: BSH Hausgeräte GmbH, Munich (DE)

( * ) Notice: Subject to any disclaimer, the term of this patent is extended or adjusted under 35 U.S.C. 154(b) by 62 days.

(21) Appl. No.: 17/796,281

(22) PCT Filed: Jan. 27, 2021

(86) PCT No.: PCT/EP2021/051843
§ 371 (c)(1),
(2) Date: Jul. 29, 2022

(87) PCT Pub. No.: WO2021/165003
PCT Pub. Date: Aug. 26, 2021

(65) Prior Publication Data
US 2023/0082503 A1 Mar. 16, 2023

(30) Foreign Application Priority Data
Feb. 19, 2020 (DE) .......................... 102020202142.2

(51) Int. Cl.
*A47L 15/42* (2006.01)
*A47L 15/00* (2006.01)
(Continued)

(52) U.S. Cl.
CPC ....... *A47L 15/4295* (2013.01); *A47L 15/0021* (2013.01); *A47L 15/4274* (2013.01);
(Continued)

(58) Field of Classification Search
None
See application file for complete search history.

(56) References Cited

U.S. PATENT DOCUMENTS 10,809,685 B2 * 10/2020 Fawaz .................. G05B 19/042
2012/0138092 A1 6/2012 Ashrafzadeh
(Continued)

FOREIGN PATENT DOCUMENTS

CN 109620078 A 4/2019
DE 10048081 A1 4/2002
(Continued)

OTHER PUBLICATIONS

CN109620078A translation from espacenet, publication date Apr. 16, 2019, name of applicant Zhou Junyang.*
(Continued)

*Primary Examiner* — Rita P Adhlakha
(74) *Attorney, Agent, or Firm* — Michael E. Tschupp; Andre Pallapies; Brandon G. Braun

(57) ABSTRACT

A system includes a dishwasher including a receptacle for an item to be washed, and a control device for carrying out a washing program, which can be parameterized by a number of different washing program parameters. An image-capturing device captures an image of the receptacle and an image analysis unit classifies the item to be washed in the receptacle in dependence on the captured image of the receptacle and to output a classification result to the control device. The control device is designed to parameterize the washing program depending on the classification result.

18 Claims, 8 Drawing Sheets

(51) Int. Cl.
*A47L 15/46* (2006.01)
*G06V 10/143* (2022.01)
*G06V 10/764* (2022.01)
*G06V 10/82* (2022.01)

(52) U.S. Cl.
CPC ............ *A47L 15/46* (2013.01); *G06V 10/143* (2022.01); *G06V 10/764* (2022.01); *G06V 10/82* (2022.01); *A47L 2401/04* (2013.01); *A47L 2401/34* (2013.01); *A47L 2501/30* (2013.01)

(56) References Cited

U.S. PATENT DOCUMENTS

| | | |
|---|---|---|
| 2018/0214001 A1 | 8/2018 | Wöbkemeier |
| 2019/0200841 A1 | 7/2019 | Yoshimoto |
| 2020/0178755 A1 | 6/2020 | Terrádez Alemany |
| 2021/0127942 A1 | 5/2021 | Terrádez Alemany |

FOREIGN PATENT DOCUMENTS

| | | |
|---|---|---|
| DE | 102018009311 A1 | 5/2020 |
| EP | 1192893 A2 | 4/2002 |
| WO | 2018103958 A1 | 6/2018 |
| WO | 2020226922 A1 | 11/2020 |

OTHER PUBLICATIONS

National Search Report DE 10 2020 202 142.2 dated Jan. 20, 2021.
International Search Report PCT/EP2021/051843 dated Feb. 12, 2021.

* cited by examiner

SYSTEM COMPRISING A DISHWASHER AND METHOD FOR OPERATING A DISHWASHER

CROSS-REFERENCES TO RELATED APPLICATIONS

This application is the U.S. National Stage of International Application No. PCT/EP2021/051843, filed Jan. 27, 2021, which designated the United States and has been published as International Publication No. WO 2021/165003 A1 and which claims the priority of German Patent Application, Serial No. 10 2020 202 142.2, filed Feb. 19, 2020, pursuant to 35 U.S.C. 119 (a)-(d).

The contents of International Application No. PCT/EP2021/051843 and German Patent Application, Serial No. 10 2020 202 142.2 are incorporated herein by reference in their entireties as if fully set forth herein.

BACKGROUND OF THE INVENTION

The present invention relates to a system comprising a dishwasher and a method for operating a dishwasher.

The cleaning performance of known dishwashers depends on the selected washing program, which preferably should be appropriately set and started by the user depending on the loading of the dishwasher. It has been shown that, in view of the many available options, users are overwhelmed. This generally results in many users simply starting a "standard program", in spite of the many different options. Dishwashers, which, for example, automatically determine a loading quantity of the dishwasher with items to be washed as well as a dirt load on the items to be washed and then correspondingly adapt the washing program by using different sensor systems, are known. As a result, for example, savings and improvements may be achieved in the washing result relative to a manual operation. An optimal control of the washing program is not possible, however, since information, for example relative to the arrangement of the items to be washed or a nature of the items to be washed, is not determined.

WO 2018 103 958 A1 discloses a dishwasher which is able to communicate with a server by means of a network connection. An image of the items to be washed arranged in the dishwasher is recorded and transmitted to the server by means of a mobile device. The server compares the received image with stored reference images in order to determine the type of loading. A suitable washing program is selected on the basis thereof by the server and transmitted to the dishwasher.

BRIEF SUMMARY OF THE INVENTION

Against this background, an object of the present invention is to improve further the operation of a dishwasher.

According to a first aspect, a system comprising a dishwasher, preferably a household dishwasher, is proposed, with a control device for carrying out a washing program, which can be parameterized by means of a number of different washing program parameters, and with an image-capturing device for capturing an image of a receptacle for the items to be washed of the dishwasher. The system also comprises an image analysis unit for classifying items to be washed arranged in the receptacle for items to be washed, depending on the captured image of the receptacle for items to be washed and for outputting a classification result to the control device. The control device is designed to parameterize the washing program depending on the classification result.

This system has the advantage that when parameterizing the washing program a characteristic, such as a material of the items to be washed arranged in the receptacle for items to be washed, may be taken into consideration. Additionally, a spatial arrangement of the items to be washed in the receptacle for items to be washed may be taken into consideration. Overall, therefore, the washing program may be optimally parameterized even in very different situations, such as different items to be washed and/or a different arrangement of the items to be washed in the receptacle for items to be washed, which contributes to an improved washing result. Moreover, resources such as water, time, energy and detergent may be saved, since the washing program may be parameterized in a very targeted manner. For example, it may be identified that only the items to be washed in a lower receptacle for items to be washed have to be washed, but an upper receptacle for items to be washed is empty. Then the washing program may be parameterized such that, when the washing program is carried out, washing liquor is applied only to a lower spray arm. The washing program thus requires less water, energy and detergent, and additionally may be completed in a shorter time. Advantageously, in the present case the parameterizing of the washing program is carried out fully automatically and specifically each time when a user starts the dishwasher, without the user having to make a selection. The aforementioned advantages are achieved, in particular, by merely one image-capturing device, even when the dishwasher has a plurality of receptacles for items to be washed.

The control device may be implemented by hardware technology and/or software technology. In the case of an implementation by hardware technology, the control device may be configured, for example, as a computer or as a microprocessor. In the case of an implementation by software technology, the control device may be configured as a computer program product, as a function, as a routine, as part of a program code or as an executable object.

It may be provided that a number of different washing programs may be predetermined, wherein a selection is made by the user, or also by the control device, of one of the washing programs. The predetermined washing programs in this case, for example, are an intensive program, a short program, a delicate program, an energy-saving program or also a glass program. In each case, these washing programs differ, in particular, relative to their parameter ranges for individual or all washing program parameters, in order to facilitate the most important aspect in the best possible manner. For example, in the intensive washing program the most important aspect is a particularly high cleaning action which may be required, for example, in the case of heavily soiled items to be washed. This is achieved, for example, by means of a high washing liquor temperature, a high quantity of detergent to be added, a longer program running time and/or a high pump speed. In the energy-saving program, for example, an energy consumption which is as low as possible is the most important aspect, which may be achieved, for example, by means of a low washing liquor temperature, a low pump speed and a longer program running time. In this case, the washing program parameters for each of the washing programs of the number of washing programs are not fixed but are able to be selected, for example, within predetermined limits. For the parameterizing of the respective washing program, the control device then selects a value within the respective predetermined value range.

The image-capturing device preferably comprises a digital sensor with a sensor surface, which has a plurality of light-sensitive image points (pixels), such as for example a CMOS (complementary metal-oxide-semiconductor) or CCD (charge-coupled device). A resolution of the digital sensor is preferably at least 0.3 MP (MP=mega pixel), preferably at least 1 MP, further preferably up to 8 MP, further preferably between 8-16 MP, further preferably above 16 MP. The image-capturing device is thus designed to output a digital image, preferably as a data set, which may be further processed by means of digital data processing or signal processing. The image-capturing device in this case is fixedly arranged on the dishwasher. The image-capturing device may additionally comprise an optical element, such as a lens or a mirror, in order to optimize a capturing range of the image-capturing device. Individual elements of the image-capturing device may also be movably mounted such that, for example, a focal plane and/or the capturing range may be changed. Moreover, the image-capturing device may have a controller which, for example, undertakes a focusing, selects a capturing range and/or fixes exposure settings and triggers the image-capturing device.

The dishwasher preferably has one or more receptacles for items to be washed. The receptacles for items to be washed may also be denoted as crockery baskets. The dishwasher has, for example, a washing container which is closable by means of a door. When the door is closed, the receptacles for items to be washed are arranged in the washing container and are preferably able to be moved out of the washing container, for example by means of a rail and/or roller system. Thus the receptacles for items to be washed may be pulled out from the washing container for convenient loading with items to be washed.

The image analysis unit may be implemented by hardware technology and/or software technology. In the case of an implementation by hardware technology, the image analysis unit may be configured, for example, as a computer or as a microprocessor, preferably a graphics processor. In the case of an implementation by software technology, the image analysis unit may be configured as a computer program product, as a function, as a routine, as part of a washing program code or as an executable object.

The image analysis unit is preferably a constituent part of the dishwasher but it may also be provided that the image analysis unit is arranged externally relative to the dishwasher.

The image analysis unit is designed to carry out an image recognition, in order to classify the items to be washed arranged in the receptacle for items to be washed. In this case, the image analysis unit may carry out, in particular, a classification, a localization, an object detection and/or an instance segmentation of the image. The image analysis unit is designed to use different digital signal processing methods, such as filter methods, data analysis algorithms and the like.

The result of the classification comprises, for example, information relating to a distribution and a type of the items to be washed in the receptacle for items to be washed. In this case, in particular, classes of the material of the items to be washed, such as glass, metal, plastic, wood or ceramics, are differentiated. Additionally, an "empty" class is also differentiated when no items to be washed are arranged on a specific receptacle for items to be washed. An additional class is "undetermined", for example when the image analysis unit does not achieve a clear result.

The classification result is preferably pixel-precise for one respectively captured image, i.e. an assignment to one of the designated classes is included for each pixel of the captured image. Thus a very accurate parameterizing of the washing program may be achieved by the control device. The classification, therefore, preferably takes place quantitatively.

The classification is preferably carried out only when a user has started the dishwasher in order to carry out a washing program. Thus the situation may be avoided where a classification is carried out before a final loading state of the dishwasher with items to be washed is established. Moreover, sufficient time still remains immediately after the start of a washing program for carrying out the classification, since initially, for example, water is supplied and heated.

For parameterizing the washing program, the control device fixes a value for at least one washing program parameter depending on the classification result. This does not preclude, for example, that individual washing program parameters have a standard value. Examples of parameterizable washing program parameters are a water temperature, a duration of a sub-program step, a pump speed of a circulating pump, a metering of a detergent of an automatic metering system, wherein this may comprise both a metering time and a metered quantity, a control of a water switch, an activation and/or control of a specific washing zone and an activation and/or control of a drying device. The aforementioned washing program parameters may in this case be fixed individually by the control device for each sub-program step of one respective washing program. The control device may be designed to generate the entire washing program, i.e. from individual sub-program steps, such as soaking, prewash, main wash, rinsing with rinse-aid, drying and the like, to create a washing program, wherein the washing program parameters may be individually fixed for each of the sub-program steps. It may also be said that the control device fixes a sub-program step parameter matrix for each sub-program step when parameterizing the washing program.

The control device is designed to carry out the washing program which is parameterized in such a manner.

According to one embodiment, the dishwasher has a position sensor unit for capturing a position of the receptacle for items to be washed and for outputting a position signal to the image-capturing device, wherein the image-capturing device is designed to capture the image depending on the position signal.

This has the advantage that the image-capturing device captures the image of the receptacle for items to be washed when this is arranged in a predetermined position, in particular in a capturing range of the image-capturing device. As described above, the receptacle for items to be washed is mounted so as to be able to be moved out of the washing container. The position sensor unit is preferably designed to output the position signal such that the image-capturing device captures the image when the receptacle for items to be washed is in a moved-out position, i.e. is pulled out of the washing container for loading.

The position sensor unit may be a mechanical switch or button, a proximity sensor, a magnetic sensor, a capacitive sensor, an ultrasonic sensor, a light barrier, an inclination angle sensor, a marker on the receptacle for items to be washed or the like. For example, the position sensor unit comprises a magnetic sensor, which is arranged in the vicinity of a loading opening of the washing container, wherein a corresponding magnet is arranged on the receptacle for items to be washed. When the receptacle for items to be washed is pulled out, in the pulled-out position of the receptacle for items to be washed the magnet comes into the vicinity of the magnetic sensor or is moved past said sensor.

Then the position sensor unit outputs a signal which causes the image-capturing device to capture an image in which the receptacle for items to be washed is visible in this case. The position sensor unit may also comprise a combination of a plurality of the aforementioned sensors or, when the position signal is output, the position sensor unit may consider the sensor signals of a plurality of sensors.

According to a further embodiment, the position sensor unit is designed to output the position signal when the receptacle for items to be washed is visible, preferably completely visible, in a field of view of the image-capturing device.

In embodiments it may be provided that a user triggers the capturing of an image manually. This may take place by means of a gesture, a voice command and/or by means of an input device such as a knob or a touch-sensitive button, or the like.

According to a further embodiment, the image-capturing device is designed to capture an extended spectral range which comprises at least the visual spectral range and the near infrared range.

This embodiment is advantageous since the captured image contains more information, which is available for the image analysis unit. Additionally, the near infrared range which, for example, comprises a range of 800 nm-2500 nm may be used, even in unfavorable visual lighting conditions.

In embodiments, it may be provided to configure the image-capturing device as a monochrome camera or a two-color camera. In one embodiment, the monochrome camera captures, for example, the entire spectrum but outputs only a gray-scale image. In a further embodiment, a filter is arranged in front of a sensor of the camera, said filter permitting only a narrow range of the spectrum to pass, for example a wavelength range with a half-value width of 10 nm, 20 nm, 30 nm, 40 nm, or up to 50 nm around a central wavelength. A two-color camera accordingly has, for example, two different filters which in each case cover different pixels of the image sensor so that the captured image has two color channels.

In embodiments, the image analysis unit is designed to select from the entire spectral range of the captured image two sub-regions (color channels) which preferably do not overlap. The selection is made, in particular, such that contrasts are particularly high between the different materials of the items to be washed which are respectively assigned to a class. Preferably, the color channels to be used for a dishwasher are predetermined and then remain fixed. However, different color channels may also be selected for different dishwashers. It may also be provided that the color channels are reselected again each time depending on specific parameters, such as for example an ambient brightness, a color temperature of the ambient light or the like. In this case, it may also be provided that a color channel is widened or narrowed. In this manner, the reliability of the classification by the image analysis unit may be increased.

In embodiments, an illumination unit which illuminates the receptacle for items to be washed is also provided for capturing the image by the image-capturing device. The illumination unit comprises, for example, a flash unit which emits a broadband flash. Alternatively or additionally, a laser scanner which scans the receptacle for items to be washed, when the image is captured, may also be provided. In this case, selectively individual wavelengths which are particularly suitable for the classification may be selected for the respective laser. In particular, the illumination unit may use an infrared spectral range for the illumination, since this may not be perceived by the human eye and thus does not irritate a user of the dishwasher.

According to a further embodiment, the dishwasher also comprises a washing container with a peripheral washing container flange around a loading opening of the washing container, wherein the image-capturing device is arranged in or on an upper flange portion of the washing container flange assigned to a ceiling of the washing container, and wherein the image-capturing device faces away from the washing container and obliquely in the direction of a plane spanned by a bottom of the washing container.

The arrangement of the image-capturing device is advantageous since this image-capturing device is arranged outside a region accessible to the washing liquor, which is why the environmental conditions for sensitive electronic components may also be controlled in a relatively simple manner.

The washing container flange is preferably located outside a washing chamber which is sealed by means of a sealing device.

According to a further embodiment, a cavity, in which the image-capturing device is received at least in some sections, is provided in or on the washing container flange, wherein the cavity is defined by a transparent element, preferably in the direction of the plane.

This embodiment ensures that the image-capturing device is arranged on the dishwasher such that it does not protrude or is perceived as disruptive. A dishwasher which has the washing container flange with the cavity, but is not provided with an image-capturing device, may also be relatively easily retrofitted.

The transparent element is configured, for example, as a plastic pane, a mineral glass pane, a glass pane or the like. The transparent element preferably ensures a seal of the cavity downwardly, in the direction of the plane, so that steam from the washing chamber may not enter the cavity when the door is opened after a washing program has finished. For example, a corresponding sealing device is provided to this end. The transparent element is preferably transparent for the entire spectral range captured by the image-capturing device. In embodiments, however, it may also be provided that the transparent element is only selectively transparent for specific regions of the spectral range. Then the transparent element additionally acts as a filter.

In embodiments, the image-capturing device is arranged entirely in the cavity, wherein the cavity is sealed as a whole. In other words, in particular, no moisture is able to penetrate the cavity, which is advantageous for the service life of the image-capturing device.

According to a further embodiment, the image-capturing device has a vertical image angle of at least 90° and a horizontal image angle of at least 120°.

This ensures that the receptacle for items to be washed may be captured as a whole without individual regions, for example edge regions of the receptacle for items to be washed, being visible on the captured image. The respective image angle is preferably provided by corresponding optical elements. These optical elements may also be referred to as ultra-wide-angle optics.

According to a further embodiment, the classification result comprises information relative to the quantity, the type and/or the position of the items to be washed arranged in the receptacle for items to be washed.

In embodiments, the image analysis unit is designed to classify the items to be washed arranged in the receptacle for items to be washed depending on the captured image of the receptacle for items to be washed into the classes: empty, plastic, metal, glass or ceramics.

"Empty" means in this case that no items to be washed are arranged or have been identified at the corresponding position. An "unknown" class may also be provided if an image point is not able to be clearly assigned to one of the defined classes.

According to a further embodiment, the image analysis unit is designed to classify the items to be washed arranged in the receptacle for items to be washed, depending on the captured image of the receptacle for items to be washed, by means of a neural network.

The neural network has already been trained, in particular, before normal operation of the dishwasher, for example in a household, by means of a training data set which comprises, for example, 10,0000-100,000 images, including the assigned classification.

According to a further embodiment, a memory unit is provided for storing a number of captured images, wherein the image analysis unit is designed to classify the items to be washed arranged in the receptacle for items to be washed, depending on at least one of the stored images from the number of images.

For example, a plurality of stored images from the image analysis unit are used for the classification. As a result, for example, complementary information may be captured, whereby information content may be increased overall or a signal-noise ratio may be improved.

According to a further embodiment, the image analysis unit is integrated in the dishwasher.

According to a further embodiment, the image-capturing device and the image analysis unit are arranged together on a substrate in an integrated circuit.

This arrangement is particularly compact.

According to a further embodiment, the image analysis unit is integrated in a device arranged externally relative to the dishwasher, wherein the dishwasher is designed as a communication unit for transmitting the captured image to the image analysis unit, for receiving the classification result from the image analysis unit and for outputting the received classification result to the control device.

The external device is, for example, a server which is able to be accessed via the internet. The communication unit is designed to produce a communication connection with the external device by means of WLAN, mobile communications, Bluetooth®, LAN or the like. The communication connection in this case may be made via third-party devices, such as for example a router, wherein different communication protocols may also be used.

This embodiment has the advantage that the image analysis unit may make use of a very high computing power which is provided, for example, by the server. As a result, on the one hand, the classification may be carried out more rapidly and, on the other hand, for example more complex algorithms or neural networks may be used.

According to a further embodiment, the dishwasher has a plurality of receptacles for items to be washed, wherein the image-capturing device is designed to capture in each case an image of each of the receptacles for items to be washed.

Preferably the image-capturing device is designed to assign a captured image to the respective receptacle for items to be washed. The assignment in this case may be carried out, for example, depending on a position signal which is provided by the position sensor unit. Moreover, a distance between the image-capturing device and the receptacle for items to be washed may be captured depending on the image, for example by means of a focus determination, from which conclusions may then be drawn about the respective receptacle for items to be washed. Moreover, for example, an inclination angle sensor arranged on the door of the dishwasher may be read, wherein when the door is inclined it is possible to exclude that a lower receptacle for items to be washed is pulled out.

According to a second aspect, a method for operating a dishwasher, preferably a household dishwasher, is proposed. In a first step, an image of a receptacle for items to be washed of the dishwasher is captured. In a second step, the items to be washed which are arranged in the receptacle for items to be washed are classified depending on the captured image. In a third step, a classification result is output. In a fourth step, a washing program for washing the items to be washed is parameterized depending on the classification result.

In a further step, the control device may carry out the washing program which has been parameterized in this manner.

The method is preferably carried out by a system according to the first aspect. The method has the same advantages which are described for the system.

The embodiments and features described for the proposed system accordingly apply to the proposed method.

According to a third aspect, a computer program product is proposed, said computer program product comprising commands which, when the program is executed by a computer, cause the computer to execute the above-described method.

A computer program product, such as for example a computer program means, may be provided or delivered, for example, as a storage medium, such as for example a memory card, USB stick, CD-ROM, DVD or even in the form of a downloadable file from a server in a network. This may be carried out, for example, in a wireless communication network by the transmission of a corresponding file by the computer program product or the computer program means.

Further possible implementations of the invention also comprise not explicitly mentioned combinations of features or embodiments described above or below relative to the exemplary embodiments. In this case, the person skilled in the art will also add individual aspects as improvements or additions to the respective basic form of the invention.

BRIEF DESCRIPTION OF THE DRAWINGS

Further advantageous embodiments and aspects of the invention form the subject of the subclaims as well as the exemplary embodiments of the invention described below. Moreover, the invention is described in more detail on the basis of preferred embodiments with reference to the accompanying figures.

DETAILED DESCRIPTION OF EXEMPLARY EMBODIMENTS OF THE PRESENT INVENTION

Figure 1:
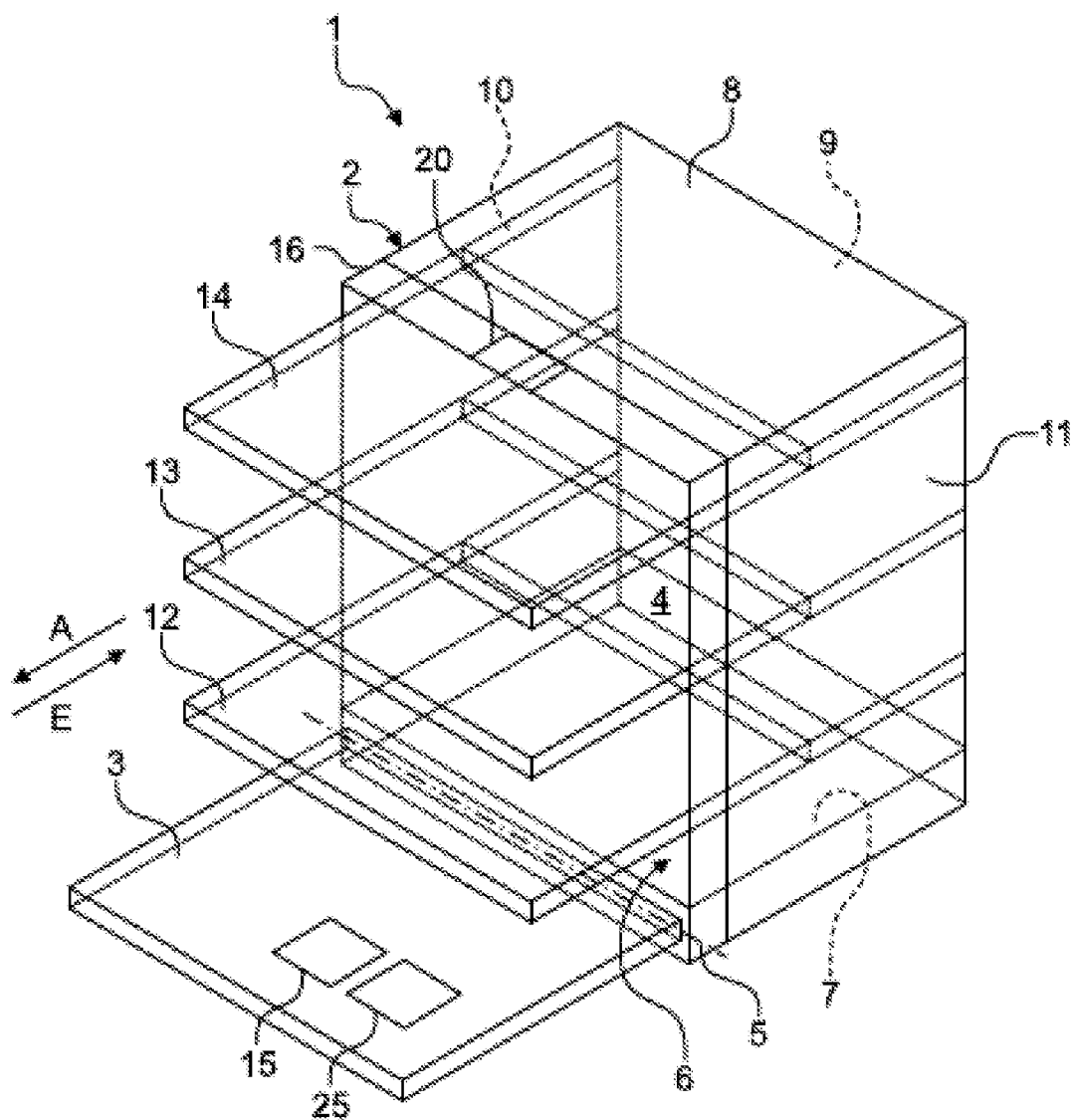
FIG. 1 shows a schematic perspective view of an embodiment of a system with a dishwasher.

Elements which are the same or functionally the same have been provided in the figures with the same reference characters, unless specified otherwise.

FIG. 1 shows a schematic perspective view of a system with a dishwasher 1 which is configured here as a household dishwasher. The household dishwasher 1 comprises a washing container 2 which is able to be closed by a door 3, in particular in a water-tight manner. To this end, a sealing device 17 (see FIG. 2) may be provided between the door 3 and the washing container 2. The washing container 2 is preferably cuboidal. The washing container 2 may be arranged in a housing of the household dishwasher 1. The washing container 2 and the door 3 may form a washing chamber 4 for washing items to be washed 51, 52, 53, 54 (see FIG. 6).

The door 3 is shown in FIG. 1 in its open position. The door 3 may be closed or opened by pivoting about a pivot axis 5 provided at a lower end of the door 3. A loading opening 6 of the washing container 2 may be closed or opened by means of the door 3. A peripheral container flange 16, which for example frames the loading opening 6, is provided on a front face of the washing container 2. The washing container 2 has a bottom 7, a ceiling 8 arranged opposite the bottom 7, a rear wall 9 arranged opposite the closed door 3, and two side walls 10, 11 arranged opposite one another. The bottom 7, the ceiling 8, the rear wall 9 and the side walls 10, 11 may be produced, for example, from a stainless steel sheet. Alternatively, for example, the bottom 7 may be produced from a plastic material.

The household dishwasher 1 also has at least one receptacle for items to be washed 12 to 14. Preferably, a plurality of receptacles for items to be washed 12 to 14, for example three thereof, may be provided, wherein the receptacle for items to be washed 12 may be a lower receptacle for items to be washed or a lower basket, the receptacle for items to be washed 13 may be an upper receptacle for items to be washed or an upper basket, and the receptacle for items to be washed 14 may be a cutlery drawer. As FIG. 1 further shows, the receptacles for items to be washed 12 to 14 are arranged one on top of the other in the washing container 2. Each receptacle for items to be washed 12 to 14 is able to be selectively moved into and out of the washing container 2. In particular, each receptacle for items to be washed 12 to 14 is able to be pushed or moved into the washing container 2 in a push-in direction E and is able to be pulled or moved out of the washing container 2 in a pull-out direction A counter to the push-in direction E.

Moreover, a control device 15 and an image analysis unit 25 are arranged in the door 3 of the household dishwasher 1. The control device 15 is designed to carry out a washing program. An image-capturing device 20 is arranged in or on the washing container flange 16, which is designed to capture an image IMG (see FIG. 6) of the receptacles for items to be washed 12, 13, 14. The captured image IMG is output by the image-capturing device 20 to the image analysis unit 25. The image analysis unit 25 is designed to classify the image IMG and to output a classification result KR (see FIG. 6) to the control device 15. The control device 15 is designed to parameterize the washing program depending on the classification result KR.

Figure 2:
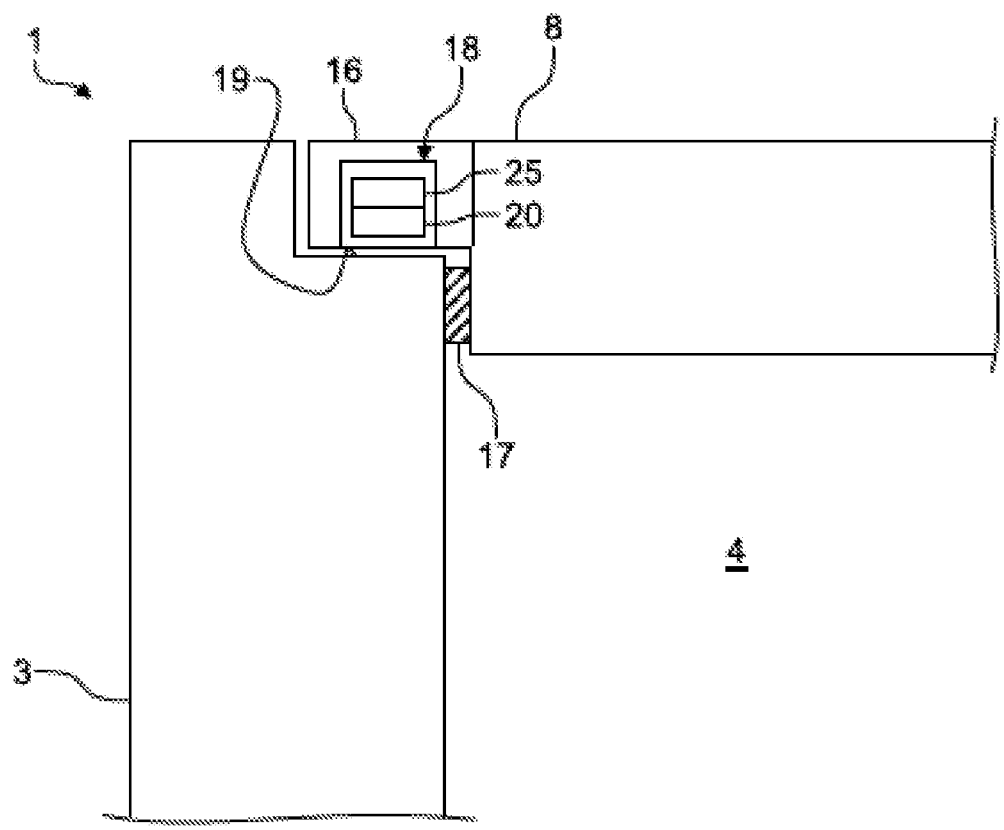
FIG. 2 shows a schematic sectional view of a detail of a dishwasher.

FIG. 2 shows a schematic sectional view of a detail of a dishwasher 1, for example the household dishwasher of FIG. 1. In FIG. 2 a section is shown through an upper flange portion of the washing container flange 16 assigned to the ceiling 8 of the washing container 2 (see FIG. 1). The door 3 is shown in the closed position, wherein a sealing device 17 is arranged between the door 3 and the washing container 2, and closes the washing chamber 4 in a fluid-tight manner. A cavity 18 which is defined in the direction of the door 3 by a transparent element 19, which is configured here as a glass pane, is arranged in the washing container flange 16. The cavity 18 is preferably sealed in a fluid-tight manner, relative to its surroundings. In this example, an image-capturing device 20 and an image analysis unit 25 are arranged in the cavity 18. The image-capturing device 20 and the image analysis unit 25 in this case are integrated on a common substrate. In the arrangement shown, the image-capturing device 20 is advantageously designed to capture an image IMG (see FIG. 6) of the receptacles for items to be washed 12, 13, 14 (see FIG. 1) through the transparent element 19. The cavity 18 is arranged as close as possible to a central point of the upper flange portion, preferably exactly in the center thereof, so that the image-capturing device 20 may take an image of the receptacle for items to be washed 12, 13, 14 as symmetrically as possible.

Figure 3:
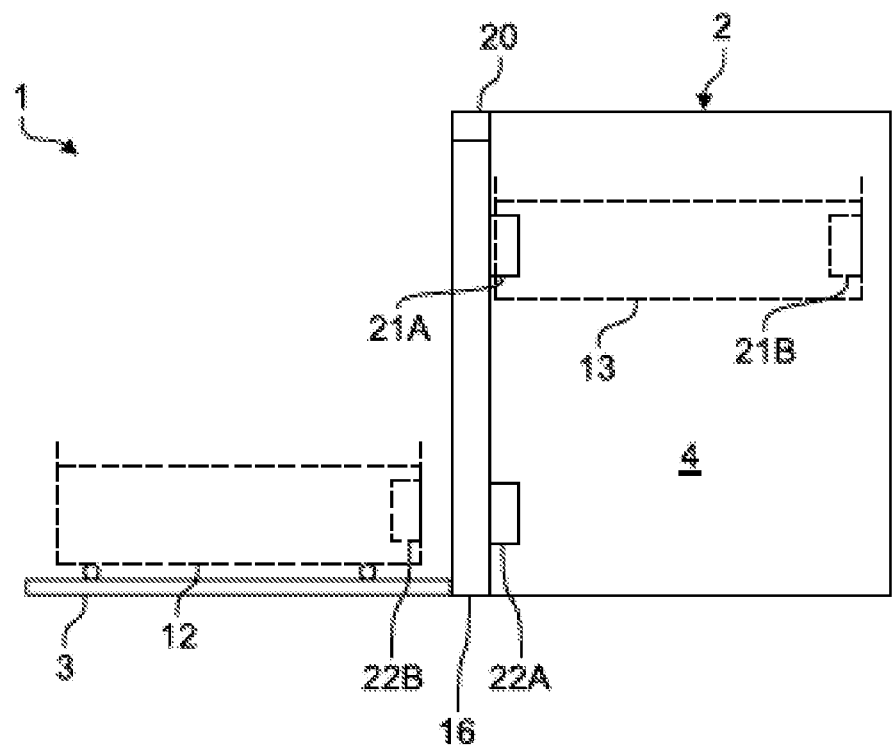
FIG. 3 shows a schematic side view of a dishwasher.

FIG. 3 shows a schematic side view of a dishwasher 1, for example the household dishwasher 1 of FIG. 1 or 2. The door 3 is shown in the open position. The image-capturing device 20 is preferably arranged as described with reference to FIG. 2 in a cavity 18 (see FIG. 2) of the washing container flange 16. The dishwasher 1 of FIG. 3 has two receptacles for items to be washed 12, 13 which may be moved into and out of the washing container 2. In this case, the lower receptacle for items to be washed 12 is in a moved-out position, where it may be loaded in a simple manner with items to be washed 51, 52, 53, 54 (see FIG. 6). Additionally, the dishwasher 1 has two position sensor units 21A, 22A, which are arranged on a front edge of the washing container 2 where the washing container flange 16 is also attached. The position sensor units 21A, 22A are configured as magnetic sensors. Each of the receptacles for items to be washed 12, 13 has a magnet 21B, 22B which is arranged in a rear region of the respective receptacle for items to be washed 12, 13.

If the respective receptacle for items to be washed is pulled out of the washing container 2, the magnet 21A, 22B is guided past the respective magnetic sensor 21A, 22A, which the respective magnetic sensor 21A, 22B captures. In this case, the magnetic sensor 21A, 22A may also capture, for example, a direction of movement of the magnet 21B, 22B. If the lower magnetic sensor 22A detects that the magnet 22B is guided past the lower receptacle for items to be washed 12, for example, it outputs a position signal to the image-capturing device 20, whereupon this image-capturing device captures an image IMG (see FIG. 6). The image IMG is preferably captured when the respective receptacle for items to be washed 12, 13 is moved into the washing container 2, since then it may be assumed that the current loading process is completed. By the use of a position sensor unit 21A, 22A which is assigned in each case to a receptacle for items to be washed 12, 13, 14, an assignment of a captured image IMG to the respective receptacle for items to be washed 12, 13, 14 is possible.

Figure 4:
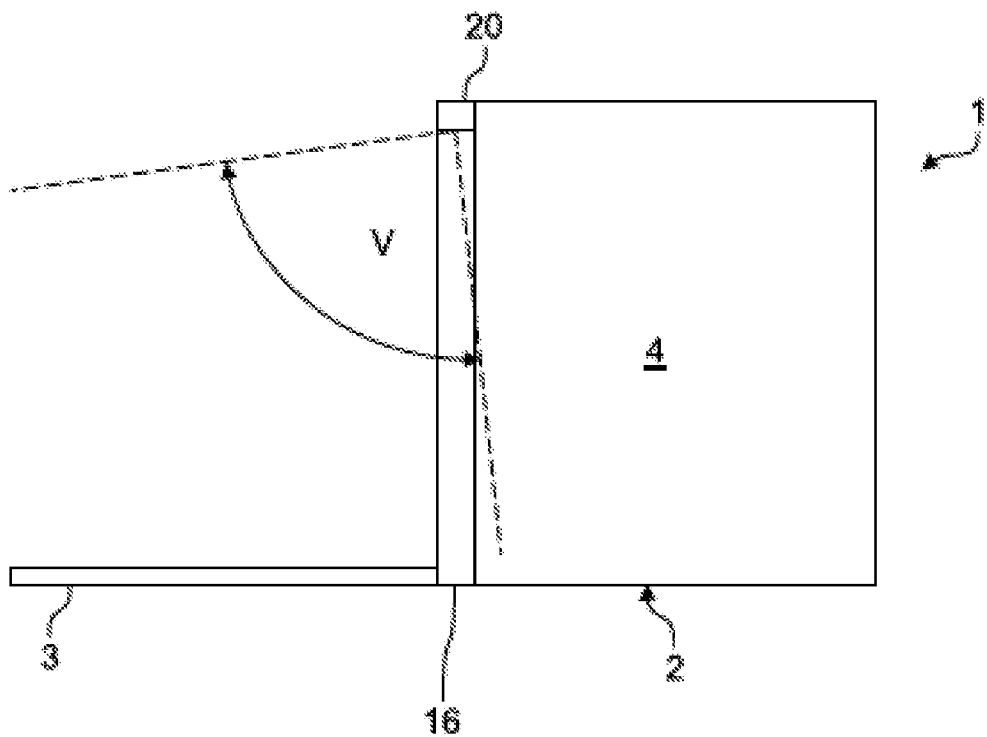
FIG. 4 shows a further schematic side view of a dishwasher.

FIG. 4 shows a further schematic side view of a dishwasher 1, for example the household dishwasher of FIG. 1, 2 or 3. The door 3 is shown here in its open position. In FIG. 4 the vertical image angle V, which the image-capturing device 20 comprises, is shown schematically. The vertical image angle V is preferably 90° but may also be greater. The image-capturing device 20 is preferably oriented such that an angle between an optical axis and a horizontal direction is 120°-135° (the acute alternate angle therefor is accordingly in the range of 45°-60°). Thus it is ensured that the image-capturing device 20 detects each of the receptacles for items to be washed 12, 13, 14 (see FIG. 1 or 3) in the respective overall length thereof.

Figure 5:
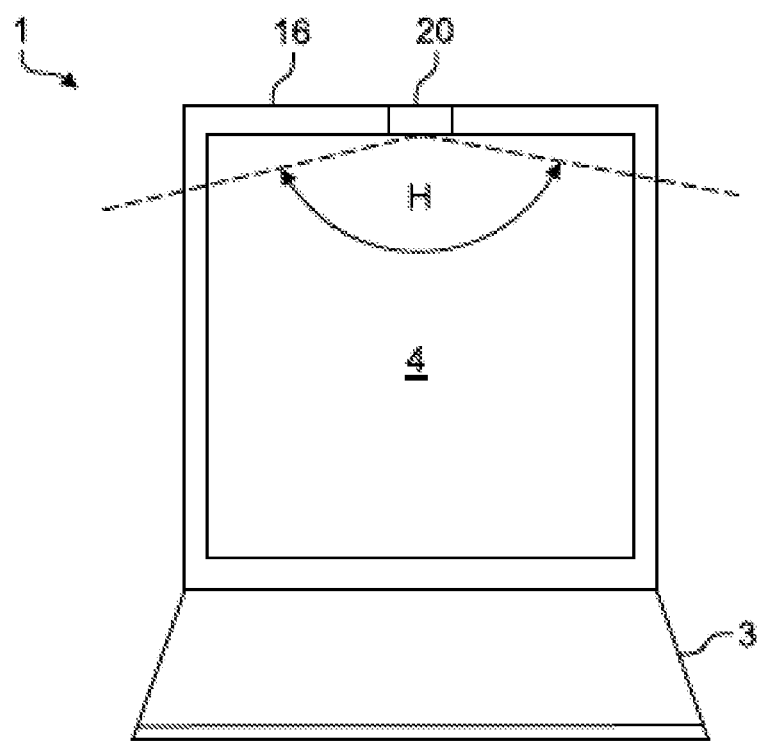
FIG. 5 shows a further schematic side view of a dishwasher.

FIG. 5 shows a schematic front view of a dishwasher 1, for example the household dishwasher of FIG. 1, 2 or 3. The door 3 is shown here in its open position. In FIG. 4 the horizontal image angle H, which the image-capturing device 20 comprises, is shown schematically. The horizontal image angle H is preferably at least 120° but may also be greater. Thus it is ensured that the image-capturing device 20 detects each of the receptacles for items to be washed 12, 13, 14 (see FIG. 1 or 3) in the respective overall width thereof.

Figure 6:
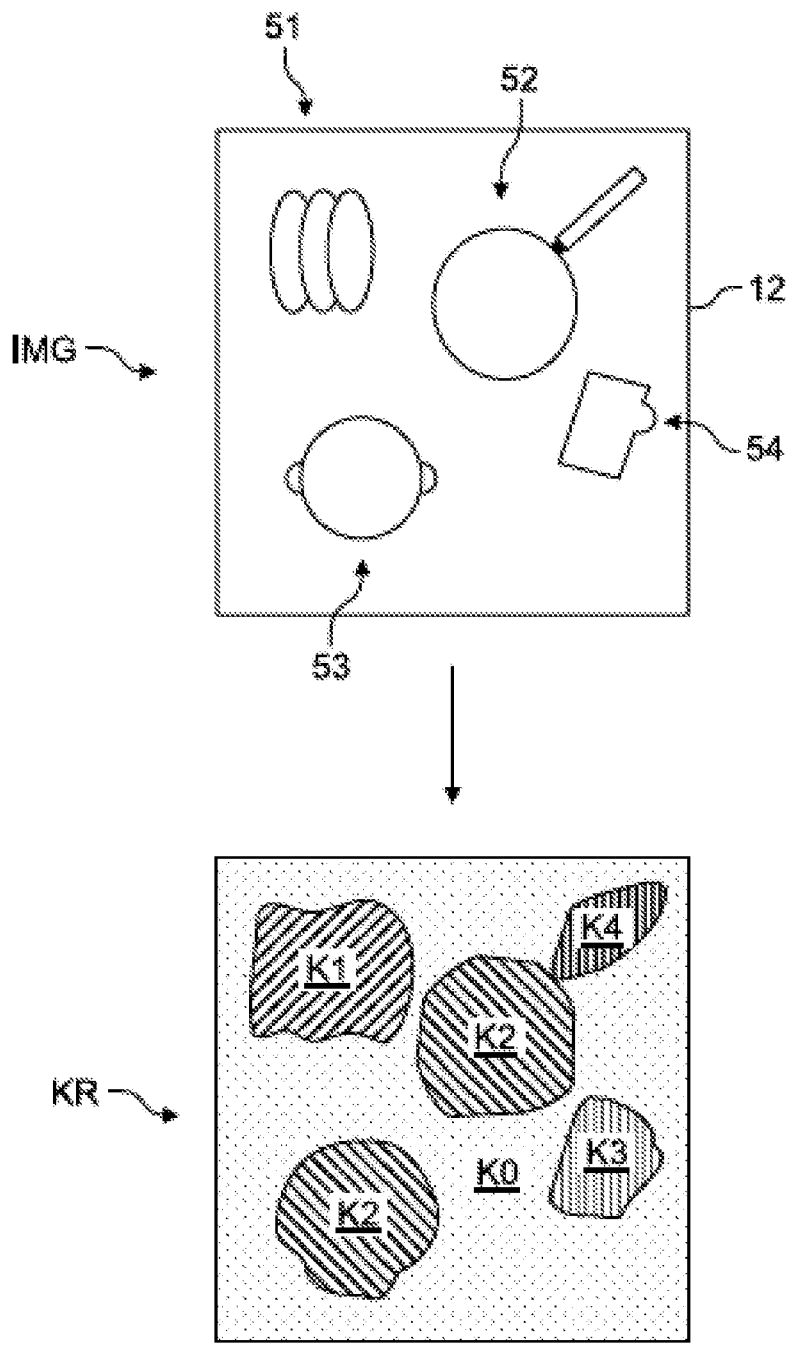
FIG. 6 shows a schematic example of a captured image and a classification result.

FIG. 6 shows a schematic example of a captured (digital) image IMG and a classification result KR. The image IMG has been captured, for example, by the image-capturing device 20 (see FIG. 1-5 or 7) of one of the dishwashers 1 of FIG. 1-5 or 7 and the classification result KR has been determined, for example, by the image analysis unit 25 (see FIG. 1, 2 or 6) of FIG. 1, 2 or 6. The captured image IMG in this case shows, for example, the lower receptacle for items to be washed 12 with the items to be washed 51, 52, 53, 54 arranged therein. In this case, it is a plate 51 made of ceramic or porcelain, a pan 52 made of metal with a plastic handle, a pot 53 made of metal and a beer mug 54 made of glass. The image-capturing device 20 in this case captures a color image with an extended spectral range of 360 nm-2500 nm.

The image analysis unit 25 (see FIG. 1, 2 or 6) is designed to classify the items to be washed 51, 52, 53, 54 on the basis of the image IMG captured by the image-capturing device 20. Preferably, the image analysis unit 25 selects from the entire spectral range two sub-regions (color channels) which do not overlap. The selection is made, in particular, such that contrasts between the different materials of the items to be washed, which are respectively assigned to a class, are particularly high. Preferably, the color channels to be used for a dishwasher 1 are predetermined and then remain fixed. However, different color channels may also be selected for different dishwashers 1. It may also be provided that the color channels are reselected again each time depending on specific parameters, such as for example an ambient brightness, a color temperature of the ambient light or the like. In this case, it may also be provided that a color channel is widened or narrowed. In this manner, it is ensured that the image analysis unit 25 carries out a reliable classification on the basis of the high contrasts.

In this example, the items to be washed 51, 52, 53, 54 are classified in the classes: empty K0, ceramic K1, metal K2, glass K3 and plastic K4. Moreover, a class for wood may be provided. This takes place, for example, by means of a neural network which carries out an object recognition. The classification preferably takes place in a pixel-precise manner. The classification result KR may, as shown in FIG. 6, be output as a two-dimensional matrix, which has as many rows and columns as the digital image IMG. Each input of the matrix in this case is assigned to one of the classes K0-K4. The classification result KR thus comprises a quantitative classification including a respective position of the items to be washed 51, 52, 53, 54 arranged in the receptacle for items to be washed 12.

Figure 7:
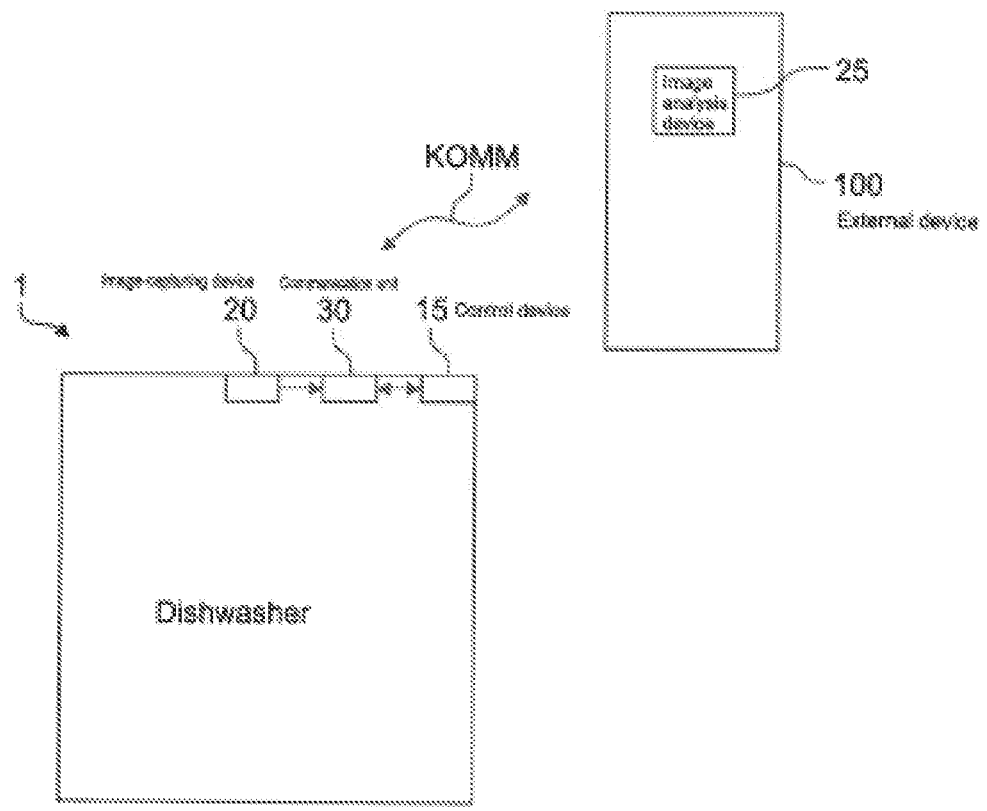
FIG. 7 shows a schematic block diagram of an arrangement with a dishwasher.

FIG. 7 shows a schematic block diagram of an arrangement comprising a dishwasher 1 and an external device 100. The dishwasher 1 has, for example, all of the features of the dishwashers shown in FIGS. 1-5. Additionally, the dishwasher 1 comprises a communication unit 30 for producing a communication connection KOMM with the external device 100, which for example is a server which is operated by a manufacturer of the dishwasher 1 and which may be accessed via the internet. In this case, the server 100 comprises an image analysis unit 25 which is designed to classify items to be washed 51, 52, 53, 54 (see FIG. 6) arranged in the receptacle for items to be washed 12, 13, 14, (see FIG. 1 or 3) of the dishwasher 1, depending on the captured image IMG (see FIG. 6) of the receptacle for items to be washed 12, 13, 14, and for the output of a classification result KR (see FIG. 6) to the communication unit 30 of the dishwasher 1. The communication unit 30 receives the captured image IMG from the image-capturing device 20 and transmits the image via the communication connection KOMM to the image analysis unit 25. Then the communication unit 30 receives the classification result KR from the image analysis unit 25 via the communication connection KOMM and outputs this classification result to the control device 15 of the dishwasher 1. The control device 15 is designed to parameterize the washing program depending on the classification result KR.

Figure 8:
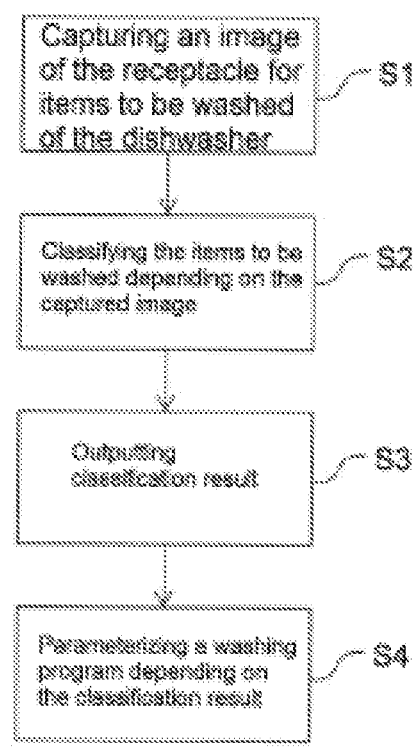
FIG. 8 shows a schematic block diagram of an exemplary method for operating a dishwasher.

FIG. 8 shows a schematic block diagram of an exemplary method for operating a dishwasher 1, for example the dishwasher of FIG. 1-5 or 7. In a first step S1, an image IMG (see FIG. 6) of a receptacle for items to be washed 12, 13, 14 (see FIG. 1, 3 or 6) of the dishwasher 1 is captured. This is carried out, for example, by an image-capturing device 20 arranged on the dishwasher 1 (see FIG. 1-5 or 7). In a second step S2, the items to be washed 51, 52, 53, 54 (see FIG. 6) arranged in the receptacle for items to be washed 12, 13, 14 are classified depending on the captured image IMG. This is carried out, for example, by an image analysis unit 25 (see FIG. 1, 3, or 7). In a third step S3, a classification result KR (see FIG. 6) is output, preferably to a control device 15 (see FIG. 1 or 6). In a fourth step S4, a washing program is parameterized for washing the items to be washed 51, 52, 53, 54 depending on the classification result KR.

Whilst the present invention has been described with reference to exemplary embodiments, it may be modified in many different ways. In particular, elements which are not shown in a figure may be present in the same manner as described with reference to a further figure. Thus, for example, each dishwasher has a control device even if this may be configured differently in different dishwashers.

The invention claimed is:

1. A system, comprising:
   a dishwasher including a receptacle in which an item to be washed is configured to be arranged, the receptacle being adjustable using a rail or a roller system to be positioned at a pulled-out position to load the item to be washed in the receptacle;
   a control device for carrying out a washing program, which is parameterizable by a number of different washing program parameters;
   an image-capturing device designed to capture an image of the receptacle based on the receptacle being positioned within a capturing range of the image-capturing device, the capturing range comprising the pulled-out position of the receptacle;
   a position sensor unit designed to capture a position of the receptacle and to output a position signal to the image-capturing device in response to the receptacle being in the pulled-out position, the position signal configured to cause the image-capturing device to capture the image of the receptacle such that the receptacle is completely visible in the pulled-out position in the captured image; and an image analysis unit designed to classify the item to be washed in the receptacle in dependence on the captured image of the receptacle and to output a classification result to the control device, wherein the control device is designed to parameterize the washing program depending on the classification result.

2. The system of claim 1, wherein the dishwasher is a household dishwasher.

3. The system of claim 1, wherein the image-capturing device is designed to capture an extended spectral range which comprises at least a visual spectral range and a near infrared range.

4. The system of claim 1, wherein the dishwasher comprises a washing container with a peripheral washing container flange around a loading opening of the washing container, said image-capturing device being arranged in or on an upper flange portion of the peripheral washing container flange where the upper flange portion is assigned to a ceiling of the washing container, with the image-capturing device facing away from the washing container and obliquely in a direction of a plane spanned by a bottom of the washing container.

5. The system of claim 4, wherein the peripheral washing container flange comprises a cavity in which at least one section of the image-capturing device is received.

6. The system of claim 1, wherein the image-capturing device has a vertical image angle of at least 90° and a horizontal image angle of at least 120°.

7. The system of claim 1, wherein the classification result comprises information regarding a quantity, type and/or position of the item to be washed in the receptacle.

8. The system of claim 1, wherein the image analysis unit is designed to classify the item to be washed in the receptacle in dependence on the captured image of the receptacle via a neural network.

9. The system of claim 1, further comprising a memory unit configured to store a number of captured images, said image analysis unit classifying the item to be washed in the receptacle in dependence on at least one of the stored captured images of the number of captured images.

10. The system of claim 1, wherein the image analysis unit is integrated in the dishwasher.

11. The system of claim 1, wherein the image-capturing device and the image analysis unit are arranged together on a substrate in an integrated circuit.

12. The system of claim 1, wherein the image analysis unit is integrated in a device arranged externally relative to the dishwasher, said dishwasher being designed as a communication unit for transmitting the captured image to the image analysis unit, for receiving the classification result from the image analysis unit, and for outputting the received classification result to the control device.

13. The system of claim 1, wherein the dishwasher includes a plurality of receptacles, said image-capturing device capturing at least one image of each receptacle of the plurality of receptacles.

14. The system of claim 13, wherein the dishwasher comprises a plurality of position sensor units such that each position sensor unit of the plurality of position sensor units corresponds to a respective receptacle of the plurality of receptacles.

15. The system of claim 13, wherein the image-capturing device is designed to assign each captured image to a respective receptacle of the plurality of receptacles.

16. The system of claim 15, wherein each captured image is assigned to the respective receptacle based at least on a respective position signal provided by a respective position sensor unit corresponding to the respective receptacle.

17. A method for operating a dishwasher, said method comprising:

outputting, by a position sensor unit of the dishwasher that captures a position of a receptacle of the dishwasher, a position signal in response to the receptacle being in a pulled-out position;

capturing, by an image-capturing device in response to receiving the position signal, an image of the receptacle of the dishwasher in which an item to be washed is configured to be arranged, the image being captured by the image-capturing device in response to the receptacle being in the pulled-out position within a capturing range of the image-capturing device such that the receptacle is completely visible in the pulled-out position in the captured image, wherein the capturing range comprises the pulled-out position to which the receptacle is adjustable using a rail or a roller system to load the item to be washed in the receptacle;

classifying the item to be washed in the receptacle in dependence on the captured image;

outputting a classification result; and parameterizing a washing program for washing the item to be washed in dependence on the classification result.

18. The method of claim 17 for operating a household dishwasher.

* * * * *